United States Patent [19]

Durst

[11] 4,031,261

[45] June 21, 1977

[54] PREPARATION OF FAT-CONTAINING BEVERAGES

[75] Inventor: Jack R. Durst, Minneapolis, Minn.

[73] Assignee: The Pillsbury Company, Minneapolis, Minn.

[22] Filed: Mar. 10, 1975

[21] Appl. No.: 556,757

Related U.S. Application Data

[63] Continuation-in-part of Ser. No. 351,729, April 16, 1973, abandoned.

[52] U.S. Cl. .............................. 426/565; 426/143; 426/144; 426/524; 426/569; 426/580; 426/585; 426/601

[51] Int. Cl.² ...................... A23G 9/00; A23G 9/04

[58] Field of Search .......... 426/143, 144, 564, 565, 426/567, 569, 580, 524, 601, 98, 99, 579, 101

[56] References Cited

UNITED STATES PATENTS

| 2,309,133 | 1/1943 | Moore | 426/390 |
|---|---|---|---|
| 2,913,342 | 11/1959 | Cameron et al. | 426/98 |
| 3,246,992 | 4/1966 | Noznick et al. | 426/567 |
| 3,479,187 | 11/1969 | Arbuckle | 426/580 |
| 3,535,122 | 10/1970 | Mussellwhite et al. | 426/565 |
| 3,563,761 | 2/1971 | Ellinger | 426/567 |
| 3,851,083 | 11/1974 | Brooking et al. | 426/98 X |

Primary Examiner—David M. Naff
Attorney, Agent, or Firm—James V. Harmon; Michael D. Ellwein

[57] ABSTRACT

Fat-containing beverages such as shakes for frozen storage and thawing by reconstitution are prepared by vigorously mixing edible fat in liquid state with an edible hydrophilic film former and water while the film former is in saturated solution to encapsulate the fat with the film former and produce a stable dispersion. Thereafter, additional water is added to dilute the dispersion to the consistency of the beverage being prepared and the diluted dispersion is mixed to produce a smooth uniform dispersion and overrun, and frozen to a hard solid mass. Several configurations of the frozen beverage especially adapted for rapid reconstitution by microwave energy are disclosed.

18 Claims, 8 Drawing Figures

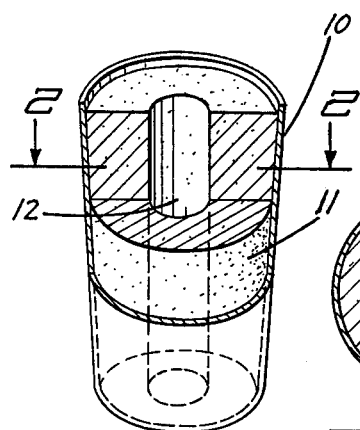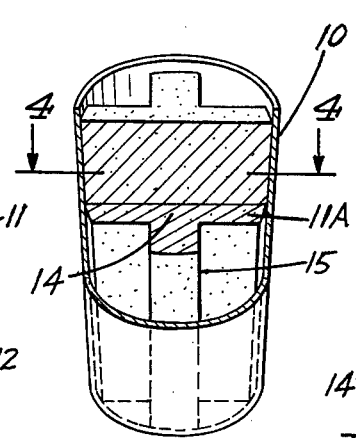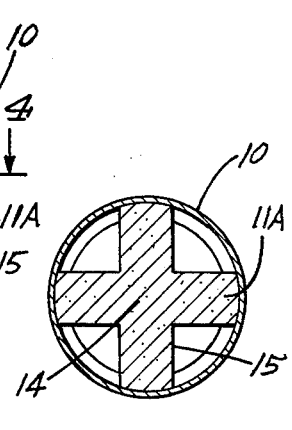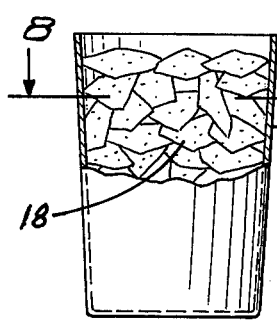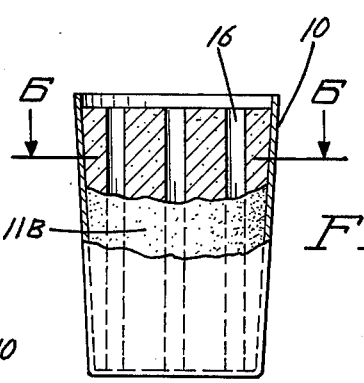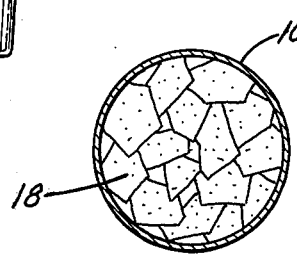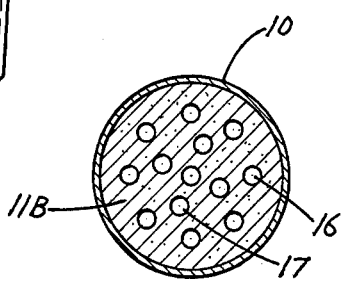

PREPARATION OF FAT-CONTAINING BEVERAGES

This application is a continuation-in-part of Applicant's prior application Ser. No. 351,729, filed Apr. 16, 1973, now abandoned.

FIELD OF THE INVENTION

The invention relates to foods and beverages and particularly to fat-containing foods and beverages to be reconstituted from a frozen condition.

THE PRIOR ART

This invention relates to the preparation of fat containing beverages, such as shakes, hot chocolate, and the like by stable dispersion or encapsulation techniques. Frozen drinks prepared according to this invention are especially adapted for reconstitution from the frozen state without the disadvantages inherent in similar products prepared according to prior art methods.

The recent rapid increase in so-called "fast food" outlets, particularly of the hamburger and shake type, has given rise to a requirement for shakes which can be prepared in advance of need, stored and served during peak periods of maximum demand. Thus, shakes have been made by conventional emulsion techniques, frozen and then reconstituted by rapid thawing. Because all of the water of the drink is present when the emulsion is made by conventional emulsion techniques, the shake products when frozen have larger ice crystals. They are much harder as solids so that, when thawed by microwave energy, they tend to have large quantities of hard unthawed shake material. The entrained air which produces the desired creaminess is not well retained, resulting in lower "over-run" and a more watery shake. When the hard lumps in the thawed shake are finally broken by physical means, such as a spoon or straw, the resulting shake is watery and some larger ice crystals remain. Lactose often tends to crystalize giving a sandy or grainy texture.

One commercially available shake made from ice cream and three commercially available soft-serve shakes were evaluated for reconstitution after frozen storage. All of these shakes performed poorly. It was found that if the shakes were first passed through a soft serve machine, thereby incorporating somewhat more air into the shakes, their performance could be improved somewhat. However, even with this additional step, the formation of ice crystals over a relatively short period of time, caused the shakes to lose their consumer appeal. The ice crystals seem to form randomly throughout the product. After a month or two, the size of these crystals is so large that the eating characteristics of the shakes is very poor after being reconstituted by placing the frozen shakes in a microwave oven. Moreover, after a month or two of storage a sandier, grainy accumulation of what appears to be lactose crystals begins to become noticeable. After several months of storage these lactose crystals become large enough so that their sandy character can be easily noticed. This is quite objectionable.

The shakes produced according to the present invention, when thawed, are thick and creamy like freshly made milk shakes. They do not lose their over-run when thawed. This is due to the stable dispersion technique which allows stable encapsulation and uniform distribution of the fat. Only enough water is used in the preparation of the stable dispersion to plasticize the film former. This results in a thicker film encapsulating the fat globules. Upon dilution with more water the thicker film remains, the encapsulated fat globules merely being further apart. This imparts a more stable and smaller crystal structure upon freezing which allows even microwave thawing with little or no loss of retained air. By heating the thawed shake, a smooth creamy hot drink may be prepared.

THE OBJECTS

A principal object of the present invention is to provide a method of preparing shakes which will remain in good condition through a period of frozen storage of up to nine months or longer from the standpoint of absence of large ice crystals, lactose crystals and loss of entrained air.

It is another object of the invention to make possible the preparation of shakes from both dairy and non-dairy materials and mixtures of the two, and at substantially reduced ingredient costs.

Another object of the invention is the preparation of shakes utilizing polyunsaturated fats for those who restrict their intake of saturated fat for dietary purposes.

A further object of the invention is the preparation of frozen food materials having enhanced flavor characteristics due to the small particle size and even distribution of encapsulated flavor materials.

THE FIGURES

FIG. 1 is an elevation in perspective partly broken away and in section showing one form in which the drink composition according to the present invention may be frozen for storage.

FIG. 2 is a section on the line 2—2 of FIG. 1 and in the direction of the arrows.

FIG. 3 is an elevation in perspective partly broken away and in section showing another form of frozen drink composition.

FIG. 4 is a section on the line 4—4 of FIG. 3 and in the direction of the arrows.

FIG. 5 is an elevation partly broken away showing a still further form of frozen drink composition.

FIG. 6 is a section on the line 6—6 of FIG. 5 and in the direction of the arrows.

FIG. 7 is an elevation partly broken away and in section showing a still further form of frozen drink composition and, FIG. 8 is a section on the line 8—8 of FIG. 7 and in the direction of the arrows.

SUMMARY OF THE INVENTION

Broadly stated, the method of preparing shakes and other drinks according to the present invention comprises the steps of: (1) preparing an aqueous homogeneous stable dispersion of one part of edible fat in the liquid state by vigorously mixing (preferably by mixing at high speed) with from about ½ to 4 parts edible hydrophilic film former (the film former being plasticized with the minimum amount of water to allow it to form a film) to encapsulate the fat globules, the film former in other words being saturated in the water at the time the fat is encapsulated as determined by the B Test described hereinbelow, (2) thereafter adding at least 10% more water than already used to provide the desired consistency of the reconstituted drink and, (3) mixing and chilling to get proper over-run (air incorporation) and (4) freezing, preferably in a configuration that aids reconstitution to shake consistency. The drinks are hard frozen. Then, the frozen product is placed in storage until needed at which time it is thawed to the extent to produce the desired drink.

DESCRIPTION OF THE PREFERRED EMBODIMENT

As used herein, "edible fat" means any of various liquefiable solid and semi-solid or liquid edible organic compounds comprising the glyceride esters of fatty acids and associated phosphatides, sterols, alcohols, hydrocarbons, ketones and related compounds and mixtures thereof.

Among the liquid edible fats which may be employed are cottonseed oil, corn oil, peanut oil, soybean oil, linseed oil, safflower oil, sesame oil, sunflower oil, melted lard, melted margarine and margarine base, melted butter and butter oil, melted waxes, and the like used singly or in admixture. The fats may be solid at room temperature but must be in the liquid state when the dispersion is formed i.e. it should be liquid at the temperature at which the dispersion is formed. The term "fat" herein is used in the broad sense to include both liquid and solid fats.

Among the various edible hydrophilic film forming substances which may be used are egg albumin, sodium proteinate of soybeans, wheat germ, gelatin, sodium caseinate, non-fat milk solids, whole egg, pea flour, bean flour, corn germ, gelatinized starch, carboxymethyl cellulose, agar agar, fish protein, soybean protein, whey, dextran, bran protein, polyvinyl alcohol, polyvinyl pyrrolidone, peanut protein, gum arabic, polytetran, buttermilk solids, soy protein isolate, lactalbumin and the like. The film formers may likewise be used singly or in compatible combinations. For example, sodium caseinate and egg albumin are commonly used together.

The film former should be saturated whether or not other solids are present. The term "saturated" as used herein below refers to the state of the dispersion at the end of the first stage of mixing, that is to say, when the fat is encapsulated as determined by the B Saturation Test to be described shortly. The B test is a viscosity break-point test which is carried out in the following manner.

Fifty grams of the film former is mixed under vacuum with distilled water starting with a higher concentration of the film former than is needed to produce a saturated solution. The mixture is held at 150° F. during mixing for all film formers that will not denature. For all other products (primarily albumens and mixtures of them with other film formers) 110° F. is used. The film former and water mixture is mixed with a paddle blade mixer at 300 rpm. for 15 minutes at which time it will be fully dispersed as judged by appearance. A 1 gram sample is then removed and placed on an evaporating dish for the determination of the exact solids content by drying and weighing. Another portion of the same material is then placed in a Rotovisco viscometer which has been heated to the same temperature as the sample. The sample is allowed to just cover the line on the viscometer cup. An SVII spindle is used and a spindle speed is selected which gives the closest to a full scale reading at that viscosity. The viscosity and spindle speed is then recorded. This process is repeated many times by adding increments of water (5 or 10 milliliters at a time) to the samples. The solids content measurement is then repeated and the viscosity measurement is made after each increment of water is added. The rotovisco reading are converted to centipoise units according to the Rotovisco instructions. These viscosity points are then plotted on graph paper (concentration VF viscosity). The break-point or intersection between the two segments of the viscosity line indicate the concentration of the film former and the dispersion at the saturation point, in other words the minimum amount of water necessary to allow the film former to form a film.

Table 1 below illustrates the saturation points of typical film formers. While the physical and chemical characteristics of all film formers mentioned herein are similar enough to permit them to be used, because of limitations on time and resources, the saturation points of all operable materials could not be determined. Table 1 merely depicts typical representatives and is not to be regarded as all inclusive. It should also be understood that it is not necessary to know the saturation point precisely, provided the film former is present at least in the amount necessary to produce saturation when the fat is added.

Table 1

Saturation Point of Representative Edible Film Formers In Water Determined by Viscosity Break Points Test B

| Film Former | % Solids by Weight At Saturation |
| --- | --- |
| Sodium Caseinate | 20–22 |
| 80% Sodium Caseinate + 20% Sucrose | 35–36 |
| Soy Protein Isolate (Supro 610) | 13–14 |
| Soy Protein Isolate (Supro 610) 83% + 17% Sucrose | 14–15 |
| Egg Albumen (Dried) | 26–27 |
| Non-Fat Dry Milk (high heat processed) | 50–51 |
| Non-Fat Dry Milk (low heat processed) | 59–60 |
| Gum Arabic | 37–38 |
| Gelatin (275 bloom) | 39–40 |
| Dried Wheat Germ | 34.5–35.5 |
| CMC | 6.9–7.3 |
| Soy Flour | 24.5–25.5 |
| Whole Egg (Dried) | 35.5–36.5 |
| A Mixture Composed Of: 25% Egg Albumen (dried) 25% Sodium Caseinate 50% N.F.D.M. (high heat processed) | 35–36 |
| A Mixture Composed Of: 40% N.F.D.M. (high heat) 40% Gelatin (275 bloom) 20% Sodium Caseinate | 34–35 |

Items 14 and 15 of Table 1 are mixtures each composed of three of the film formers tested above. While the actual saturation point of mixture 14 was between 35 and 36%, the arithmetically determined saturation point is 37.1. In the case of mixture number 15, the measured saturation point was from 34 to 35% while the arithmetically determined saturation point was 40.2%. Consequently, while the saturation point of enumerable film former mixtures cannot be determined mathematically, the actual saturation point can readily be determined by running the B Test.

It is also important to note that in items 2 and 4 above, that sugar when added to the aqueous film former dispersion raises the saturation point of the film former, acting as a plasticizer rather than lowering it as would be expected if it merely bound a part of the water making it unavailable for the film former. Thus, the film former in prior compositions containing both sugar and film former is less saturated, in other words, further than the saturation point than the same composition without sugar. It is entirely satisfactory to add sugar or other plasticizers such as glycerine, propylene glycol as well as other edible materials such as flavors during stage 1 mixing as illustrated in the examples below. Materials such as cocoa behave from a physical standpoint more or less as inert fillers. In any event, whether non-aqueous plasticizers, fillers or other solids are present in addition to the film formers, the film former itself should nevertheless be saturated at the end of the first stage of mixing as determined by the B Test.

The success of the invention is based largely upon the discovery that improved results can be obtained by preparing fat containing beverages in at least two mixing stages, the first stage utilizing a saturated aqueous dispersion of film former with the fat present so as to encapsulate the fat while the film former is saturated, and the second comprises the addition of at least 10% more water than already used with further mixing.

In order to form the stable dispersion in accordance with the invention as contrasted with a mere emulsion, the film former is plasticized during the first stage of mixing with water to form a saturated solution of the film former rather than an unsaturated solution and it is important to make sure that the solution is saturated when the fat is first mixed with the film former. More plasticizer i.e. water in the amount of at least 10% of that already used and preferably in the range of six or more times the amount of water used in the first stage is added later. The amount of water used in the first mixing stage as a plasticizer to provide saturation varies with the solubility of the film former. The best way to determine the amount of plasticizer to be used in the initial mixing is to use an amount small enough to allow the formation of a stable dispersion. The dispersion is stable if the mixture does not separate into oil and liquid layers and in addition after standing for an hour a drop of the dispersion when placed in a beaker of warm 125° F. water does not produce free oil droplets which float to the surface and coalesce. While the amount of plasticizer added can vary within wide limits, the amount should be kept near the minimum needed i.e. saturation point during initial mixing in order that a dispersion of maximum stability is produced. A film former containing a minimum amount of plasticizer can be looked upon as being equivalent to a saturated solution of that film former in the plasticizer. For example, sodium caseinate in approximately 20% concentration by weight is a saturated solution. Egg alubmin in approximately 26% concentration by weight is a saturated solution. Dry milk (low heat processed) in approximately 60% concentration is a saturated solution.

To make a palatable drink, various flavoring agents and flavor enhancers such as sugar, salt, cocoa, chocolate, calcium lactate, citric acid, vanilla, fruit flavors, and the like are included along with other common additives such as coloring agents, vitamins, anti-oxidants, texture improvers, fillers, humectants, preservatives and the like. Oil soluble additives are included with the fat prior to formation of a stable dispersion. No chemical emulsifier is used.

The carboxymethyl cellulose and alginates function as film formers but are primarily present because they add viscosity and thickness to the composition. They are added after the stable dispersion is formed and are not essential for stable dispersion formation per se but body the formula. Gelatinized starch can also be used for this purpose. These materials also help over-run, in other words, ability of the composition to hold air and give it creaminess. Citric acid, and calcium lactate improve the flavor of milk type products. Maltrin, which is a hydrolyzed cereal solid, helps to body the formula and is not essential for stable dispersion formation.

The drink materials are admixed in generally the proportions desired in the reconstituted drink ready for consumption. Generally, the fat is present in the finished product in amounts between about 2½ to 5% by weight. The film former is present in amounts to provide protein from about ½ to 4 parts for each 1 part of fat i.e. from about 1.25 to 20% by weight of the final product and preferably in an amount equal to the fat present. The blend of dried whey and casein (Dari Pro 36) described in one example is 35.9% protein and it is the primary film former; another primary film former that can be used is non-fat milk solids which also has 35.9% protein. A third is a caseinate which is 90% protein. Another is sodium proteinate of soy, again 90% protein. Of the last two materials less is used so that the protein level is preferably about the same as the oil used.

Sugar is present in the final product in an amount between about 10 and 15%, depending upon desired sweetness. The remaining additives are present in a minor amount, usually less than 1%, and the balance is water, which comprises broadly from about 50 to 90% of the final product but preferably from about 70 to 75% by weight of the final product, depending upon the desired thickness and creaminess of the reconstituted drink. Another possible use of the present invention is in preparing creamy soft serve type products. Regular soft serve type products have 35% solids and 65% water. The dispersion type products of the present invention make similar bodied soft serve products at 26–27% solids and 74 to 73% water. This can be a considerable saving. Of the water, in the first mixing stage only that sufficient to plasticize the film former is admixed initially and mixing is vigorous. Preferably mixing is carried out at high speed i.e. under high shear conditions e.g. in a Waring blender; the balance of the water is added in one or more increments after formation of the stable dispersion. The dispersion must still, however, be stable as defined above after the addition of these increments of water. The more water used in the first mixing stage the more nearly the product is to an ordinary emulsion and the less it is like the desired stable dispersion.

The dispersion is then mixed by stirring with chilling to a soft uniform consistency of a shake with the proper degree of over-run and then frozen in proper configuration for easy reconstitution to shake consistency. The mixture is desirably hard frozen quickly by blast freezing and then stored, desirably between about 0° to −8° F.

It has been found that the frozen drink material can be stored for many months (up to 9 months) without adverse effect. At the time of need, the frozen drink mixture may be withdrawn from storage and reconstituted. The drink can be reconstituted into ordinary shake consistency by microwave energy in 45 seconds, for example, in a Litton 70/50 microwave oven at 1225 watts. Alternatively, the drink may be reconstituted to shake consistency in 15 minutes at 250° F. in a conventional gas or electric oven, in 1 hour at room temperature (72° F.) and in 5 hours at refrigerator temperatures (35°–39° F.). If a hot drink is desired, as hot chocolate, the thawed drink may be heated to the desired higher temperature and will maintain its creamy consistency.

In order to promote rapid and uniform thawing, the drink mixture is desirably frozen in a configuration having open spaces or voids. For thawing by use of microwave energy, the frozen drink mixture should not exceed about 1 inch in thickness since microwaves can penetrate only approximately 1 inch.

Referring now to the drawings, there are shown several configurations of frozen drink mixture especially adapted for microwave thawing.

In FIGS. 1 and 2, there is shown a generally cylindrical cup 10 having walls tapering slightly toward the bottom and formed from wax paper or thin synthetic resinous sheet material, or foam plastic, or the like, as commonly used in the dispensing of milk shakes and the like. The cup 10 is substantially filled with a mass 11 of frozen drink mixture extending almost to the top of the cup. The frozen mass 11 is formed with a hollow central core 12 of diameter such that the wall thickness of the annular mass of frozen drink mixture does not exceed about 1 inch. This prevents the existence of a large unthawed center mass when the drink mixture is served. The hollow core also acts as a quality control means in that if the product becomes thawed due to improper storage and then is refrozen, the hole in the center disappears.

In FIGS. 3 and 4, there is shown an alternative form of frozen drink mixture in which the frozen mass 11A extruded or otherwise shaped in the form of a solid central core 14 having a plurality of spokes or fins 15 radiating therefrom, all of which are not greater than about 1 inch in thickness. This mass is contained in cup 10 for storage and reconstitution.

In FIGS. 5 and 6, there is shown a further form of configuration in which the frozen shake mass 11B contained in cup 10 is provided with a plurality of spaced apart generally vertical holes 16 and 17 extending to the bottom of the cup. Holes 16 and 17 may be of the same or different diameters and are spaced apart no more than approximately 1 inch and are spaced inwardly from the cup wall no more than about 1 inch.

In FIGS. 7 and 8, there is shown a still further configuration of frozen shake material contained in cup 10 in the form of a plurality of chips or chunks 18 loosely and randomly arrayed within the cup 10 with air spaces between the chips and chunks except at points of contact. Preferably no dimension of chips or chunks 18 exceeds about 1 inch.

Although the frozen drink is described as being frozen in a cup to be used as a drinking receptacle by the ultimate consumer, the drink can instead be frozen and stored in any of the described configurations in bulk and then at the time of consumption placed in a drinking receptacle and thawed.

The following examples further illustrate the invention:

EXAMPLE I

A typical chocolate flavored shake has the following composition:

| Ingredients | Percent by Weight |
| --- | --- |
| Hydrogenated Soybean Oil | 4.0000 |
| Sucrose | 11.0000 |
| Salt | 0.0200 |
| Pregelatinized Cocoa (Dry wt.) | 1.0000 |
| Dry Whey-Caseinate Blend* | 10.0000 |
| Chocolate Liquor | 0.3750 |
| Alginate | 0.2600 |
| Carboxymethyl Cellulose | 0.1000 |
| Calcium Lactate 5 H$_2$O | 0.0250 |
| Anhydrous Citric Acid | 0.0400 |
| Vanillin | 0.0008 |
| Water | 73.1792 |
| TOTAL | 100.0000 |

*Non-fat dry milk replacement composed of 35.9% protein that functions as the film former, Dari-Pro 36 Ralston Purina Co. St. Louis, Missouri.

Stage 1

This drink was prepared by first pregelatinizing the cocoa by heating a 20% by weight aqueous solution to cocoa i.e. 1 part cocoa to 4 parts water to 170° F. while stirring and holding for 1 hour. This material can be prepared in advance and refrigerated until used. If refrigerated, the gelatinized cocoa (20% solids — 80% water) is heated to 140° F. and weighed directly into a prewarmed Waring Blender. The whey-caseinate blend and sucrose are added with mixing to the blend of 1 part cocoa and 4 parts water to form a 47.3% by weight dispersion of the film former (protein) in water. Mixing is continued until the protein is evenly dispersed as a colloidal dispersion and the sucrose is dissolved allowing as much air stretching of the protein as possible. The dispersion then comprises sucrose 11 parts, dry whey-caseinate blend 10 parts, water 4 parts, and cocoa 1 part is saturated as measured by the B test.

The calcium lactate is added to water in the proportion of one part lactate to 30 parts water by weight and heated until dissolved. The calcium lactate solution is added slowly with mixing to the cocoa-casenate-whey-sucrose dispersion dropping the concentration of protein in water to 43%. The oil is heated to 150° F. with the chocolate liquor, stirred, and then added to the other ingredients in one increment and mixed at high speed (about 4000 rpm.) until a stable dispersion forms. This takes approximately 4 minutes. To this point the only water added is that used to gelatinize the cocoa and dissolve the calcium lactate. The dispersion is still saturated at this point as determined by the B Test.

Stage 2

Approximately one-fourth of the remaining water is then added with slow mixing to thin the stable dispersion. A mixture of the salt, carboxymethyl cellulose and alginate is added with slow mixing until evenly blended. The CMC and alginate added in this stage function primarily as thickeners rather than as a portion of the film former. The citric acid is dissolved in approximately half of the water and added to the mix. The vanillin is dissolved in the remaining water and added with slow stirring. The mixture is then chilled and mixed to a soft ice cream consistency, as by placing in a Sweden Soft Serve machine. The chilled mix is then placed in waxed paper cups with a plastic cylinder core and blast frozen. The core is then removed and the mixture is stored at freezer temperatures between about 0° to −8° F. until needed for reconstitution and consumption.

At that time the shake may be reconstituted by microwave energy, in a conventional oven, at room temperature or at refrigerator temperatures, depending upon the time and facilities available at the point of consumption. The thawed shakes are thick and creamy, resembling freshly made milk shakes and do not lose their overrun when thawed. A hot chocolate drink that is smooth and creamy has been made by lengthening the time of exposure to microwave energy.

EXAMPLE II

Strawberry flavored shakes having the following composition were prepared:

| Ingredients | Percent by Weight |
|---|---|
| Hydrogenated Soybean Oil | 4.0000 |
| Sucrose | 11.0000 |
| Salt | .0200 |
| Dry Whey-Caseinate Blend* | 10.000 |
| Alginate | .2600 |
| Carboxymethyl Cellulose | .1000 |
| Calcium Lactate 5 H$_2$O | .0250 |
| Anhydrous Citric Acid | .1125 |
| Hydrolyzed Cereal Solids | 1.0000 |
| FD&C No. 3 (dry) Red | .0005 |
| Imitation Strawberry Flavor (Dry) | .0530 |
| Imitation Strawberry Flavor (Liquid) | .0150 |
| Water | 73.4140 |
| TOTAL | 100.0000 |

*Dari-Pro 36, see Example 1

The mode of preparation was generally the same as that described in detail in Example I with a few minor differences due to the differing compositions. The cocoa and chocolate liquor were eliminated. Water equal to about 10% of the total composition was introduced to the blender during stage 1. The whey-caseinate blend and sucrose was also added in stage 1 with mixing to disperse the protein and dissolve the sugar. The second stage of mixing was then accomplished after the remaining 90% of the water was added. After preparation of the stable dispersion and thinning, the hydrolyzed cereal solids and the dry strawberry flavor were added with slow mixing along with the salt, carboxymethyl cellulose and alginate. The coloring, as a 4% solution, and liquid flavor were added in place of vanillin just prior to chilling and mixing to a soft consistency. The resulting shake after freezing, thawing and reconstitution was thick and creamy, free from ice crystals and crystallized lactose, and with good overrun.

EXAMPLE III

Vanilla flavored shakes having the following formula were prepared:

| Ingredients | Percent by Weight |
|---|---|
| Hydrogenated Soybean Oil | 4.000 |
| Sucrose | 14.350 |
| Salt | .020 |
| Dry Whey-Caseinate Blend* | 10.000 |
| Alginate | .260 |
| Carboxymethyl Cellulose | .100 |
| Calcium Lactate 5 H$_2$O | .025 |
| Anhydrous Citric Acid | .040 |
| Vanilla Extract | .650 |
| Water | 70.555 |
| TOTAL | 100.000 |

*Dari-Pro 36

The mode of preparation of these shakes was substantially the same as that described in detail in Example 1 except that the cocoa and chocolate liquor are eliminated, water is initially introduced in the amount of about 10% of the total mixture, the protein and sugar added thereto, and the vanilla extract is substituted for vanillin. The characteristics of the resulting shakes were substantially as described above, except for the vanilla flavor.

EXAMPLE IV

A further chocolate flavored shake was prepared using nonfat dry milk. Its formula is as follows:

| Ingredients | Percent by Weight |
|---|---|
| Hydrogenated Soybean Oil | 4.000 |
| Sucrose | 11.000 |
| Salt | .020 |
| Non-fat Dry Milk Solids | 10.000 |
| Alginate | .260 |
| Carboxymethyl Cellulose | .100 |
| Pregelatinized Cocoa (Dry weight) | 2.000 |
| Chocolate Liquor | .750 |
| Vanilla (Schilling's commercial) | 1.000 |
| Water | 70.870 |
| TOTAL | 100.000 |

The procedure was substantially as described in Example I. Upon thawing, the resulting shakes were smooth and creamy with good flavor.

EXAMPLE V

Another chocolate shake was prepared as in Example IV except that winterized cottonseed oil was substituted for the hydrogenated soybean oil. The results were similar.

EXAMPLE VI

Another chocolate shake was prepared as in Example 4 except that 4% butter oil was substituted for the hydrogenated soybean oil. The resulting shake was smooth and creamy but it had an overpowering butter flavor believed to be due to the small size of the fat globules produced by the stable dispersion technique.

EXAMPLE VII

A further chocolate shake was prepared as in Example IV except that 2% butter oil and 2% winterized cottonseed oil were used as the fat. The shake upon thawing was smooth and creamy but even with only 2% butter oil, the shake had too rich a butter flavor.

EXAMPLE VIII

A further chocolate shake was prepared as in Example IV except that coconut oil was substituted for hydrogenated soybean oil. To some tasters this shake appeared as if it had been made with butter oil or butter flavor.

EXAMPLE IX

A further chocolate shake was prepared as in Example I except that 0.0125% vanilla extract was added and the water was reduced to 73.1667%. The result was similar to that of Example I.

EXAMPLE X

A further chocolate shake was prepared according to Example IV except that polyunsaturated soybean oil was substituted for hydrogenated soybean oil and the results were substantially the same.

EXAMPLE XI

A chocolate malt shake having the following formulation was prepared:

| Ingredients | Percent by Weight |
| --- | --- |
| Hydrogenated Soybean Oil | 4.0000 |
| Sucrose | 10.3750 |
| Salt | .0200 |
| Pregelatinized Cocoa (Dry Weight) | 1.0000 |
| Vanilla Extract | .0875 |
| Dry Whey-Caseinate Blend* | 10.0000 |
| Alginate | .2600 |
| Carboxymethyl Cellulose | .1000 |
| Calcium Lactate 5 H$_2$O | .0250 |
| Anhydrous Citric Acid | .0400 |
| Dry Dimalt 20 | 1.0000 |
| Water | 73.0925 |
| TOTAL | 100.0000 |

*Dairy Pro 36

The procedure was generally the same as that of Example I, the malt being added after the formation and dilution of the stable dispersion. When thawed, even after several months of frozen storage, the texture and flavor of drinks prepared according to this formula were good.

EXAMPLE XII

A further vanilla shake using non-fat dry milk and non-dairy fats having the following formula was prepared:

| Ingredients | Percent by Weight |
| --- | --- |
| Coconut Oil | 2.00 |
| Winterized Cottonseed Oil | 2.00 |
| Non-Fat Dry Milk Solids | 10.00 |
| Sucrose | 11.00 |
| Salt | .02 |
| Alginate | .26 |
| Carboxymethyl Cellulose | .10 |
| Hydrolyzed Cereal Solids | 1.00 |
| Six-Fold Bourbon Vanilla Extract | 1.08 |
| Water | 72.54 |
| TOTAL | 100.00 |

The procedure was generally as described in Example I except that the cocoa, chocolate liquor and vanillin were eliminated. About 10% of the formula as water was used in the preparation of the stable dispersion. The hydrolyzed solids were added after preparation and dilution of the stabilized dispersion. Vanilla extract was added instead of the vanillin.

EXAMPLE XIII

A further strawberry shake was prepared using non-fat dry milk and non-dairy fats according to the following formula:

| Ingredients | Percent by Weight |
| --- | --- |
| Coconut Oil | 2.00000 |
| Winterized Cottonseed Oil | 2.00000 |
| Non-Fat Dry Milk | 10.00000 |
| Sucrose | 11.00000 |
| Salt | .02000 |
| Alginate | .26000 |
| Carboxymethyl Cellulose | .10000 |
| Anhydrous Citric Acid | .15000 |
| Hydrolyzed Cereal Solids | 1.00000 |
| FD&C Red No. 2 (Dry) | .00450 |
| FD&C Yellow No. 6 (Dry) | .00105 |
| Imitation Strawberry (Dry) | .05300 |
| Imitation Strawberry (Liquid) | .01900 |
| Water | 73.92500 |
| TOTAL | 100.00000 |

FD&C Red No. 3 (dry) at 0.0005% can be used instead of the Red No. 2 and Yellow No. 6, as shown.

It has been observed, as noted in Example 6 and 7, that encapsulation of fat by the described stable dispersion technique functions to enhance the flavor of the encapsulated material. It has been observed, for example, that a shake prepared using 4% butter oil or a mixture of 2% butter oil with 2% cottonseed oil produces a product that is too strong in butterfat flavor, giving the illusion of a cream-type product. This same phenomenon was experienced in the encapsulation of refined beeswax which by itself is practically tasteless but when encapsulated has a strong astringent flavor. Although not desiring to be bound by any particular theory, it is believed that the encapsulation reduces the butterfat globules and the beeswax globules to a particle size easily fitting the taste bud receptacles in the mouth. This makes possible economies in the use of fats and fat soluble flavors. Microscopic examination of reconstituted drinks after storage shows even distribution of the fat globules. All globules were sperical, that is, all were encapsulated, and ranged in size from 2 to 6 microns. Generally all of the encapsulated globules ranged between about 4 to 6 microns in diameter although variations may occur as a result of initial mixing.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method of preparing fat containing beverages for frozen storage and reconstitution by thawing comprising mixing about ½ to 4 parts edible hydrophilic film former and water in proportion to form a saturated solution of the film former in the water as determined by the B saturation test for determination of a viscosity break point, vigorously mixing one part edible fat in a liquid state with the film former and water to encapsulate the fat and form a stable dispersion while the film former is saturated as determined by said test, thereafter adding at least 10% more water than that already present in the dispersion to dilute the dispersion to the reconstituted consistency of the fat containing beverage being prepared and providing 50–90% water in the final product, mixing to produce a smooth uniform dispersion and over-run and freezing to a hard solid mass.

2. A method according to claim 1 wherein said film former is a protein.

3. A method according to claim 1 wherein said fat is present in an amount between about 2½ to 5% by weight.

4. A method according to claim 3 wherein said film former is a blend of milk proteins.

5. A method according to claim 1 wherein a fat-soluble flavoring agent is combined with said fat and film former prior to formation of said stable dispersion.

6. A method according to claim 1 wherein a non-fat soluble flavoring agent is added to the beverage after formation of the stable dispersion.

7. A method according to claim 1 wherein at least the fat or the film former is of dairy origin.

8. A method according to claim 1 wherein said fat and said film former are both of dairy origin.

9. A method according to claim 1 wherein said fat and said film former are both of non-dairy origin.

10. A method according to claim 1 wherein said beverage while freezing is shaped into generally cylindrical form and provided with at least one longitudinal channel, and then frozen into a hard shaped mass.

11. The method of claim 1 wherein the beverage is reconstituted from said frozen condition by exposing it to microwave energy.

12. A hard frozen fat-containing beverage adaptable for reconstitution by thawing made according to the method of claim 1 and comprising a homogeneous stable dispersion of edible fat globules encapsulated within an envelope of edible hydrophilic film former and uniformly distributed throughout a frozen aqueous mass.

13. A beverage according to claim 12 wherein said frozen mass is generally cylindrical and provided with at least one longitudinal channel to facilitate quick uniform thawing.

14. A beverage according to claim 12 wherein said frozen mass is adapted for thawing by microwave energy and no portion of said mass exceeds about one inch in thickness.

15. A beverage according to claim 12 wherein said fat globules are flavored and range in size between about 2 and 6 microns.

16. A beverage according to claim 13 wherein said frozen mass comprises a hollow core and a plurality of fins radiating therefrom.

17. A beverage according to claim 12 wherein said frozen mass comprises a plurality of frozen chips or chunks separated by voids except at points of contact.

18. The beverage prepared by the process of claim 1 wherein the composition contains 70 to 75% by weight water.

* * * * *